(12) United States Patent
Lee et al.

(10) Patent No.: US 11,363,298 B2
(45) Date of Patent: Jun. 14, 2022

(54) VIDEO PROCESSING APPARATUS AND PROCESSING METHOD OF VIDEO STREAM

(71) Applicant: Wistron Corporation, New Taipei (TW)

(72) Inventors: Yuan-Bin Lee, New Taipei (TW); Hsiao-Wen Tin, New Taipei (TW)

(73) Assignee: Wiston Corporation, New Taipei (TW)

( * ) Notice: Subject to any disclaimer, the term of this patent is extended or adjusted under 35 U.S.C. 154(b) by 0 days.

(21) Appl. No.: 17/022,097

(22) Filed: Sep. 16, 2020

(65) Prior Publication Data

US 2022/0038747 A1 Feb. 3, 2022

(30) Foreign Application Priority Data

Aug. 3, 2020 (TW) ................. 109126181

(51) Int. Cl.
| | |
|---|---|
| *H04N 19/65* | (2014.01) |
| *H04N 19/14* | (2014.01) |
| *H04N 19/146* | (2014.01) |
| *H04N 19/154* | (2014.01) |
| *H04N 19/172* | (2014.01) |
| *H04N 19/176* | (2014.01) |
| *H04N 7/15* | (2006.01) |

(52) U.S. Cl.
CPC ............. *H04N 19/65* (2014.11); *H04N 19/14* (2014.11); *H04N 19/146* (2014.11); *H04N 19/154* (2014.11); *H04N 19/172* (2014.11); *H04N 19/176* (2014.11); *H04N 7/15* (2013.01)

(58) Field of Classification Search
CPC ........ H04N 19/00; H04N 19/65; H04N 19/14; H04N 19/146; H04N 19/154; H04N 19/172; H04N 19/176
See application file for complete search history.

(56) References Cited

U.S. PATENT DOCUMENTS

| | | | |
|---|---|---|---|
| 9,332,275 B2 | 5/2016 | Watanabe et al. | |
| 9,456,212 B2* | 9/2016 | Wan ....................... | H04N 19/40 |
| 9,571,845 B2 | 2/2017 | Lee et al. | |

(Continued)

FOREIGN PATENT DOCUMENTS

| | | |
|---|---|---|
| CN | 100559880 | 11/2009 |
| CN | 104079925 | 10/2014 |

(Continued)

OTHER PUBLICATIONS https://web.archive.org/web/20220120191834/https://www.vcodex.com/news/skip-macroblocks/.*

(Continued)

*Primary Examiner* — Kyle M Lotfi
(74) *Attorney, Agent, or Firm* — JCIPRNET

(57) ABSTRACT

A video processing apparatus and a processing method of video stream are provided. In the method, at least one encoding unit is formed in an image frame, sub-encoding units in multiple encoding units of an image sequence are encoded according to a correlation between a first sub-encoding unit and a second sub-encoding unit in the sub-encoding units, and a video stream is generated according to an encoded result of the image sequence. The image frame is an image of the image sequence, and each of the encoding units records encoding information of a belonging block.

16 Claims, 7 Drawing Sheets

(56) References Cited

U.S. PATENT DOCUMENTS

| | | | |
|---|---|---|---|
| 9,800,877 B2 | 10/2017 | Lee et al. | |
| 9,800,878 B2 | 10/2017 | Lee et al. | |
| 9,807,404 B2 | 10/2017 | Lee et al. | |
| 9,807,405 B2 | 10/2017 | Lee et al. | |
| 10,225,565 B2 | 3/2019 | Lee et al. | |
| 2012/0327998 A1* | 12/2012 | Nilsson | H04N 19/154 375/240.02 |
| 2013/0343449 A1* | 12/2013 | Oishi | H04N 19/149 375/240.03 |
| 2014/0355678 A1 | 12/2014 | Watanabe et al. | |
| 2015/0023406 A1 | 1/2015 | Lee et al. | |
| 2015/0334404 A1 | 11/2015 | Lee et al. | |
| 2015/0334408 A1 | 11/2015 | Lee et al. | |
| 2015/0334409 A1 | 11/2015 | Lee et al. | |
| 2015/0334410 A1 | 11/2015 | Lee et al. | |
| 2018/0027247 A1 | 1/2018 | Lee et al. | |
| 2019/0045195 A1 | 2/2019 | Gokhale et al. | |
| 2020/0014950 A1 | 1/2020 | Abe et al. | |
| 2021/0195223 A1* | 6/2021 | Chang | H04N 19/187 |
| 2021/0225040 A1* | 7/2021 | Park | H04N 19/167 |

FOREIGN PATENT DOCUMENTS

| | | | |
|---|---|---|---|
| CN | 104333756 | 2/2015 | |
| CN | 106791828 | 5/2017 | |
| CN | 103916675 | 6/2017 | |
| CN | 108965892 | 12/2018 | |
| CN | 110324618 | 10/2019 | |
| EP | 1175058 A1 * | 1/2002 | H04N 19/00 |
| EP | 3026909 | 6/2016 | |
| TW | 201921943 | 6/2019 | |
| WO | 2013089129 | 6/2013 | |

OTHER PUBLICATIONS

"Office Action of Taiwan Counterpart Application", dated May 28, 2021, p. 1-p. 10.

"Office Action of Taiwan Related Application, application No. 109126182", dated Jun. 4, 2021, p. 1-p. 10.

"Search Report of Europe Counterpart Application", dated Jan. 19, 2021, p. 1-p. 13.

Santiago De-Luxan-Hernandez et al., "An Intra Subpartition Coding Mode for VVC", 2019 IEEE International Conference on Image Processing (ICIP), Sep. 22, 2019, pp. 1203-1207.

"Office Action of Japan Counterpart Application", dated Jan. 4, 2022, p. 1-p. 4.

* cited by examiner

VIDEO PROCESSING APPARATUS AND PROCESSING METHOD OF VIDEO STREAM

CROSS-REFERENCE TO RELATED APPLICATION

This application claims the priority benefit of Taiwan application no. 109126181, filed on Aug. 3, 2020. The entirety of the above-mentioned patent application is hereby incorporated by reference herein and made a part of this specification.

TECHNICAL FIELD

The invention relates to a video coding technology, and more particularly, to a video processing apparatus and a processing method of video stream.

BACKGROUND

In recent years, machine learning technology has achieved many notable results in many fields, especially in computer vision and image processing. However, a video coding based on machine learning is still in an initial stage. The video coding is the basis of VoIP, and its efficiency directly affects the user experience. Compared with other video applications such as background noise suppression, echo cancellation, and voice and facial recognition, the video coding is currently the fastest growing, and can be used to enhance or improve the quality of calls/videos through machine learning. It is worth noting that with the advent of the fifth-generation (5G) mobile communications era, after the emergence of mobile and efficient transmission requirements, the problem of image transmission quality is bound to be paid attention again, and the high-efficiency video coding is constantly trying to break through the limitations of network transmission.

In the application of long-distance voice conferences, VoIP can not only save costs, but also allow multiple people to talk online at the same time and provide an immersive meeting experience through various meeting tools (e.g., presentation tools, live streaming and the like). However, with the increase in the number of online users, the bandwidth demand of the network and the number of connections has relatively doubled, and the video and voice delay time is also difficult to control due to channel congestion. At this time, the quality of the meeting (e.g., quality of service (QoS)/quality of experience (QoE)) is often greatly reduced. VoIP is usually connected to the Internet via a wired network. However, in recent years, there has been an increasing demand to provide services via mobile communications (e.g., 4G or 5G mobile networks). Accordingly, the management and deployment of more resources not only increases costs, but sometimes becomes an impossible task (e.g., the bandwidth cannot exceed an upper limit in a mobile environment). With the advancement of video technology, especially the popularization of Ultra-High Definition (UHD) video, there is an urgent need to further improve compression efficiency in order to accommodate UHD video in limited storage space and limited transmission bandwidth. Therefore, how to effectively manage and control resources is one of the problems that the industry expects to solve.

In addition, with the continuous increase of network bandwidth, the demand for real-time conference video services also increases. In the case of limited bandwidth or insufficient allocation, it is easy to cause network performance degradation such as packet transmission delay, jitter, or packet loss, resulting in poor quality of VoIP video. Therefore, how to maintain the quality of real-time video transmission is also one of the problems that the industry expects to solve.

SUMMARY

In view of the above, the embodiments of the invention provide a video processing apparatus and a processing method of video stream which perform encoding based on difference between different blocks in image frame to reduce computational complexity and meeting image transmission requirements The processing method of video stream according to embodiments of the invention includes (but not limited to) the following steps. Encoding units are formed in an image frame. A plurality of sub-encoding units in the encoding units of the image sequence are encoded according to a correlation between a first sub-encoding unit and a second sub-encoding unit in the sub-encoding units. A video stream is generated according to an encoded result of the image sequence. The image frame is an image of the image sequence, and each of the encoding units records encoding information of a subordinate block.

The video processing apparatus according to the embodiments of the invention includes (but not limited to) a communication transceiver and a processor. The communication transceiver is configured to transmit or receive data. The processor is coupled to the communication transceiver, and configured to: form encoding units in an image frame, encode a plurality of sub-encoding units in the encoding units of the image sequence according to a correlation between a first sub-encoding unit and a second sub-encoding unit in the sub-encoding units, and generate a video stream according to an encoded result of the image sequence. The image frame is an image of the image sequence, and each of the encoding units records encoding information of a belonging block.

Based on the above, the video processing apparatus and the processing method of video stream of the embodiments of the invention process the encoding units of the image frame, and determine a decision for determining different sub-encoding units according to spatial and temporal correlations between these sub-encoding units in the encoding unit so that the sub-encoding units with the smaller difference can be ignored. Accordingly, an encoding complexity is reduced so the user experience can be improved.

To make the aforementioned more comprehensible, several embodiments accompanied with drawings are described in detail as follows.

DETAILED DESCRIPTION

Figure 1:
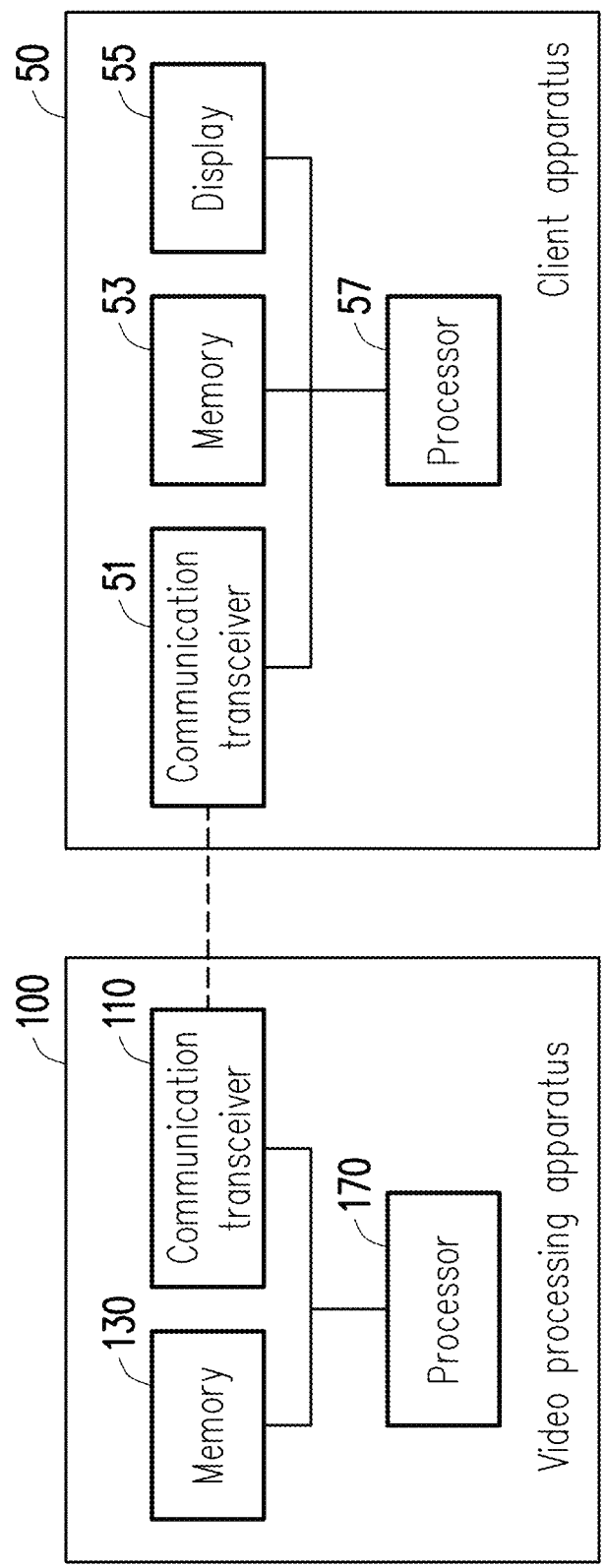
FIG. 1 is a block diagram of a video stream system according to an embodiment of the invention.

FIG. 1 is a block diagram of a video stream system 1 according to an embodiment of the invention. Referring to FIG. 1, the video stream system 1 includes (but not limited to) one or more client apparatuses 50 and a video processing apparatus 100.

The client apparatus 50 may be a desktop computer, a notebook computer, a smart phone, a smart TV, a tablet, or a set-top box. The client apparatus 50 includes (but not limited to) a communication transceiver 51, a memory 53, a display 55 and a processor 57.

The communication transceiver 51 may be a transmitting circuit and a receiving circuit supporting Ethernet, an optical fiber network, a mobile network, Wi-Fi or other communication technologies. In an embodiment, the communication transceiver 51 is used to connect to the Internet or a local area network to transmit/receive data to/from the video processing apparatus 100.

The memory 53 may be a random access memory (RAM), a read only memory (ROM), a flash memory, a hard disk drive (HDD), a solid state drive (SSD) or other similar devices in any stationary or movable form, or a combination of the above-mentioned devices. In an embodiment, the memory 53 is used to store software modules, application programs and their code, and other temporary or permanent data or files (e.g., an image sequence, an image frame, encoding information, a video stream, a quality assessment model), and these data will be detailed in subsequent embodiments.

The display 55 may be a liquid crystal display (LCD), a light-emitting diode (LED) display, or an organic light-emitting diode (OLED). In an embodiment, the display 55 is used display the image frame or a user interface.

The processor 57 may be a computing unit such as a central processing unit (CPU), a graphic processing unit (GPU), a micro control unit (MCU) or an application specific integrated circuits (ASIC). In an embodiment, the processor 57 is used to perform all operations of the client apparatus 50, and can load in and execute the software modules or the application programs stored in the memory 53. Detailed operation regarding the same will be described in subsequent embodiments.

The video processing apparatus 100 may be a desktop computer, a notebook computer, a server, a cloud platform or a background host. The video processing apparatus 100 includes (but not limited to) a communication transceiver 110, a memory 130, and a processor 170.

The implementation aspects of the communication transceiver 110, the memory 130, and the processor 170 refer to the description of the communication transceiver 51, the memory 53 and the processor 57, respectively, and will not be repeated hereinafter.

In an embodiment, the communication transceiver 110 is used to connect to the Internet or a local area network to transmit/receive data to/from the client apparatus 50.

In an embodiment, the memory 130 is used to store software modules, application programs and their code, and other temporary or permanent data or files (e.g., an image sequence, an image frame, encoding information, a video stream, an anomaly detection model), and these data will be detailed in subsequent embodiments.

In an embodiment, the processor 170 is used to perform all operations of the video processing apparatus 100, and can load in and execute the software modules or the application programs stored in the memory 130. Detailed operation regarding the same will be described in subsequent embodiments.

Hereinafter, various devices, components and modules in the video stream system 1 will be used to describe the method according to the embodiment of the invention. Each process may be adjusted based on the actual implementation, and the invention is not limited thereto.

Figure 2:
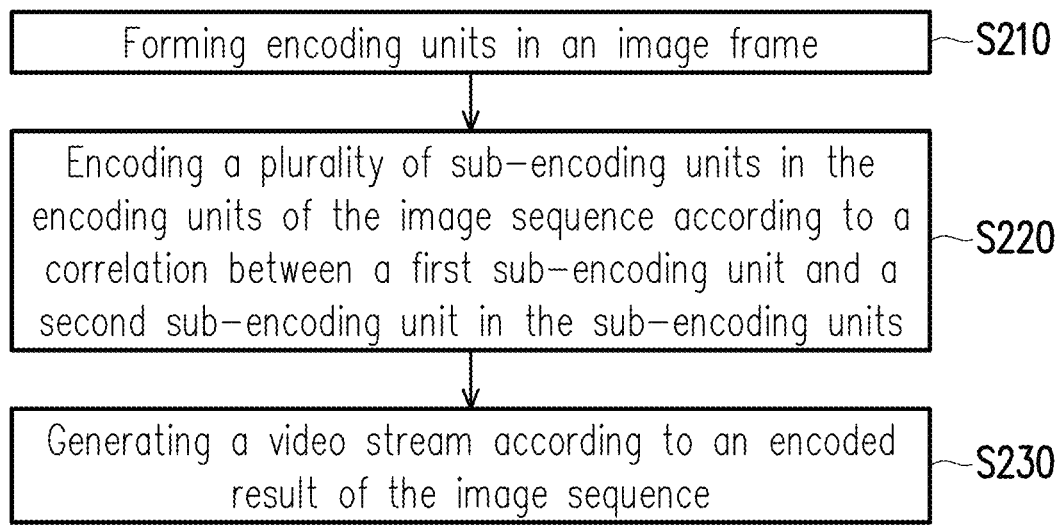
FIG. 2 is a flowchart of a processing method of video stream according to an embodiment of the invention.

FIG. 2 is a flowchart of a processing method of video stream according to an embodiment of the invention. Referring to FIG. 2, the processor 170 forms one or more encoding units in an image frame (step S210). Specifically, the image frame is a frame in the image sequence (i.e., a sequence formed by multiple frames). The image sequence may be digital video data captured by a camera, a video recorder or a monitor, and may also be video data formed and edited by any computing device (e.g., a computer, or a smart phone) for animations, movies, commercials, or TV series. The original image sequence may include a considerable amount of information (e.g., the color and brightness of each pixel), resulting in too large amount of data for transmission or storage. Therefore, it is necessary to perform a video compression processing on the image sequence.

In an embodiment, for a video coding standard such as high efficiency video coding (HEVC) or advanced video coding (MPEG-4 Part 10; MPEG-4 AVC), one or more image frames in the image sequence will be further divided into one or more processing units (e.g., coding tree unit (CTU), macroblocks or other basic encoding units) Each of the processing units may be further divided into one or more encoding units correspondingly. Each of the encoding units is used to record encoding information (e.g., encoding mode, brightness, color, or syntax) of a belonging block.

With HEVC taken as an example, before the image sequence is input for encoding in the HEVC technology, the image frames in the image sequence are respectively divided into the coding tree units with equal size and then input to an encoder for encoding. A block is where data is stored, and one unit is formed by many blocks plus a syntax element. If the input image adopts the color coding format of YUV (Luma-Chroma-Concentration), the coding tree unit is composed of one luma coding tree block (CTB), two chroma coding tree blocks and the syntax element. In other embodiments, the color coding format may be RGB (red-green-blue) or other formats.

In an embodiment, the encoding unit can be further divided to form one or more sub-encoding units. In some video coding mechanisms, the image frame is compressed by recording a residual between an actual value of the block and a predicted value of an inter prediction or an intra prediction (i.e., a difference between the actual value and the predicted value). The sub-encoding unit is used to record the residual between the predicted value and the actual value of the belonging block.

Figure 3:
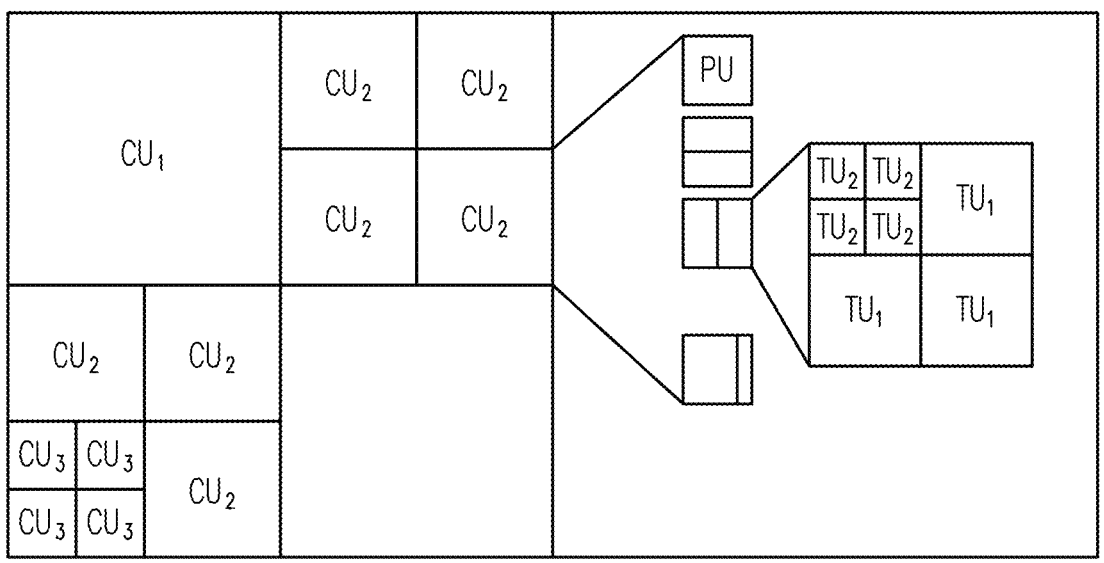
FIG. 3 is an example illustrating units.

With HEVC taken as an example, the encoding unit can be further divided to form one or more prediction units (PU) (composed of luma and chroma prediction blocks) and transform units (TU; served as the sub-encoding units). FIG. 3 is an example illustrating units. Referring to FIG. 3, the coding tree unit may include encoding units $CU_1$, $CU_2$ and $CU_3$ of different sizes (the sizes are, for example, 32×32, 16×16 and 8×8 pixels, respectively). The encoding unit $CU_2$ can further include a prediction unit PU of 8×8 pixels, a transform unit $TU_1$ of 8×8 pixels and a transform unit $TU_2$ of 4×4 pixels.

Figure 4:
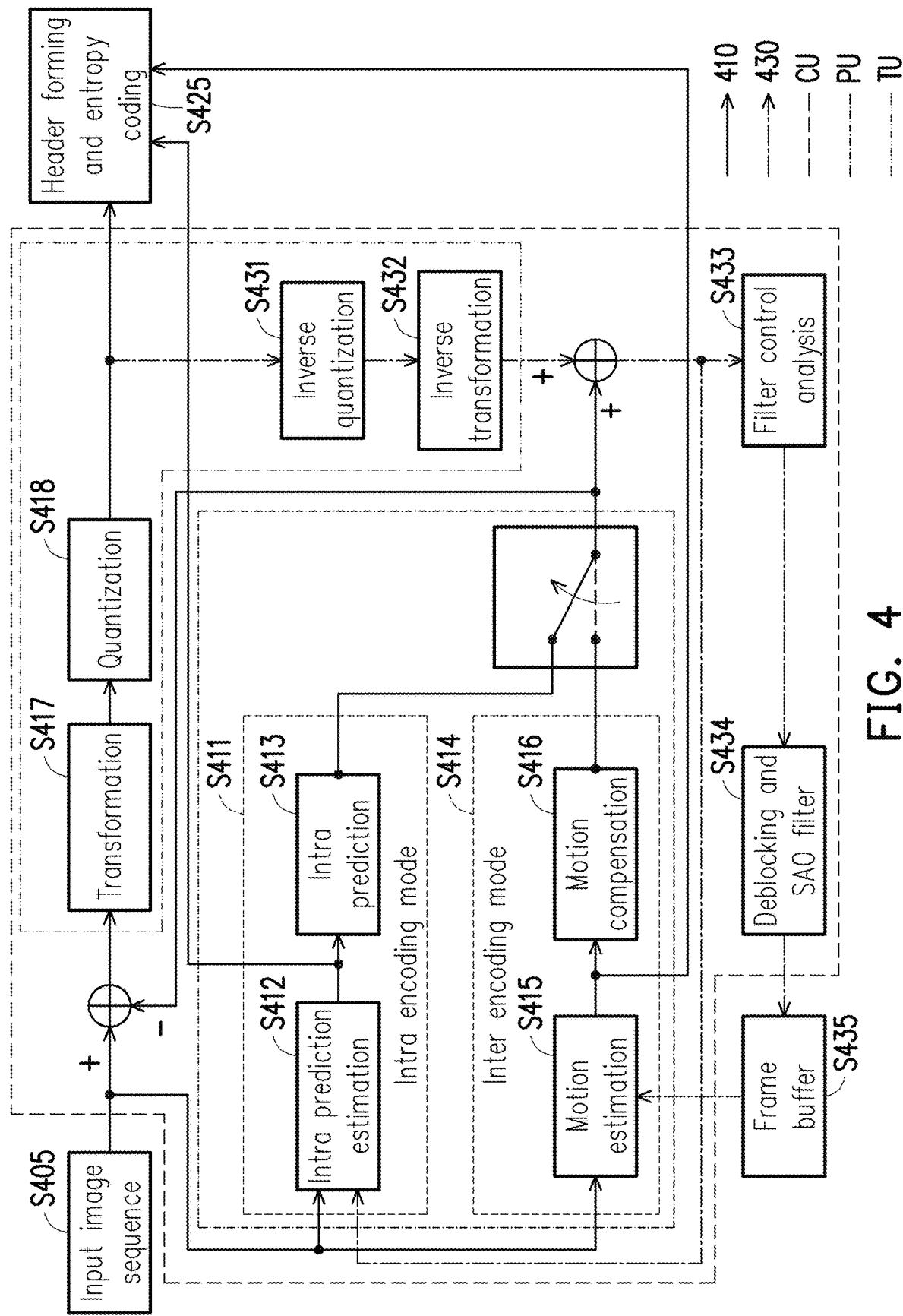
FIG. 4 is a flowchart illustrating the corresponding processing steps of each unit.

FIG. 4 is a flowchart illustrating the corresponding processing steps of each unit. Referring to FIG. 4, after inputting an image sequence (step S405), the processor 170 processes each of the encoding units CU formed by each image frame. For an encoding process 410, with respect to the prediction unit PU, the processor 170 can perform an intra prediction mode (step S411) or an inter prediction mode (step S414). The intra prediction mode includes an intra prediction estimation (step S412) and an intra prediction (step S413). The inter prediction mode includes a motion estimation (step S415) and a motion compensation (step S416). The difference between the predicted value of the intra prediction mode or the inter prediction mode and the actual value of the original image is the residual. With respect to the transform unit TU, coefficients data formed from the residual through a transformation (step S417) and a quantization (step S418), dynamic data (e.g., a dynamic vector) and filter control data estimated in the prediction mode (one of the inter prediction and the intra prediction) may be used in a header forming and entropy coding (step S425) to form a bit stream (which may be further transformed into packets by the communication transceiver 110 and transmitted to the client apparatus 50 via a network (may be forwarded via other servers)).

Fro a decoding process 430, the processor 57 of the client apparatus 50 can perform an inverse quantization (step S431) and an inverse transformation (step S432) on the transform unit TU to restore the residual. After the residual and the predicted value are combined, they will be processed in a filter control analysis (e.g., confirm a loop filter) (step S433) and a deblocking and SAO (Sample Adaptive Offset) filter (step S434) to restore the image frame, which is then stored in a frame buffer (step S435) for the display 55 to play.

It should be noted that, in some embodiments, the sub-encoding unit may have a different name from the transform unit according to different video coding specifications.

The processor 170 encodes the sub-encoding units in the encoding units of the image sequence according to a correlation between a first sub-encoding unit and a second sub-encoding unit in the sub-encoding units (S220). Specifically, although HEVC can reduce traffic, a compression time and an amount of computation required for decompression will increase, thereby greatly increasing a compression complexity. Research points out that the encoding time of HEVC is 253% higher than H.264/AVC on average, which is impractical for implementing multimedia applications. Especially for the VoIP application of real-time video, the delay of a real-time streaming may cause many losses and misunderstandings. The prediction method for dividing the encoding unit is to decide how to divide the encoding unit according to certain features in the encoding (e.g., an image content complexity, the motion vector and the like) and artificial decision rules. The encoding unit is divided into tree structures of different levels (e.g., a quadtree structure) through a recursion to form the transform units (i.e., the sub-encoding units).

Figure 5:
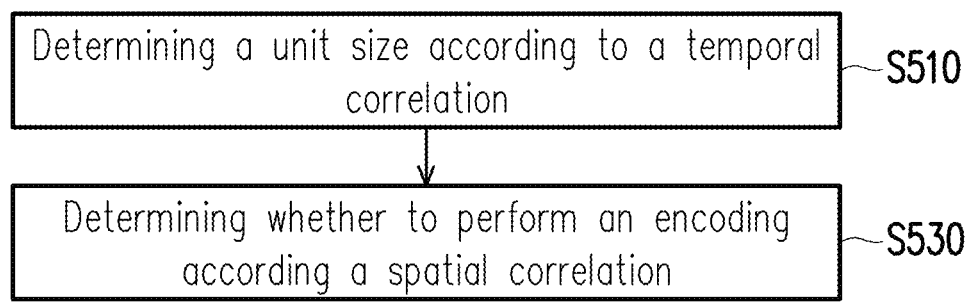
FIG. 5 is a flowchart of a processing method for decoding according to an embodiment of the invention.

For the encoding of the sub-encoding units, temporal and spatial dimensions are analyzed in the embodiment of the invention. FIG. 5 is a flowchart of a processing method for decoding according to an embodiment of the invention. Referring to FIG. 5, in an embodiment, the correlation is a temporal correlation. The processor 170 can determine a unit size of the sub-encoding unit according to the temporal correlation (step S510). Specifically, the processor 170 determines the unit size of the first sub-encoding unit or the second sub-encoding unit according to a difference between the first sub-encoding unit and the second sub-encoding unit. The second sub-encoding unit is a corresponding sub-encoding unit in another frame in the image sequence different from the image frame. The processor 170 uses the concept of "temporal" to determine the difference between different image frames (to form a temporal difference sequence), and determines the corresponding unit size through a temporal difference. If the difference is greater (representing more dissimilar pixels), the unit size is smaller and a corresponding information amount is larger; if the difference is smaller (representing more similar pixels), the unit size is larger and the corresponding information amount is smaller.

In order to obtain the temporal difference, in an embodiment, the processor 170 inputs the second sub-encoding unit to the anomaly detection model to obtain a restored unit. The anomaly detection model is trained by using the first sub-encoding unit as training data based on a machine learning algorithm. The machine learning algorithm can be AutoEncoder (AE), Denoising Autoencoder, Principal component analysis (PCA) or other algorithms. In an embodiment, the processor 170 may input one or more scene images (e.g., video conference images in conference rooms, offices, or live streaming images or the like, which are regarded as normal images) to an initial model of the machine learning algorithm for training, so as to form the anomaly detection model. In some embodiments, the processor 170 can also input test data (i.e., specific image data, such as a collection of specific scene images) to the anomaly detection model to test an accuracy rate and a failure rate of the anomaly detection model, and correct the anomaly detection model accordingly.

Figure 6A:
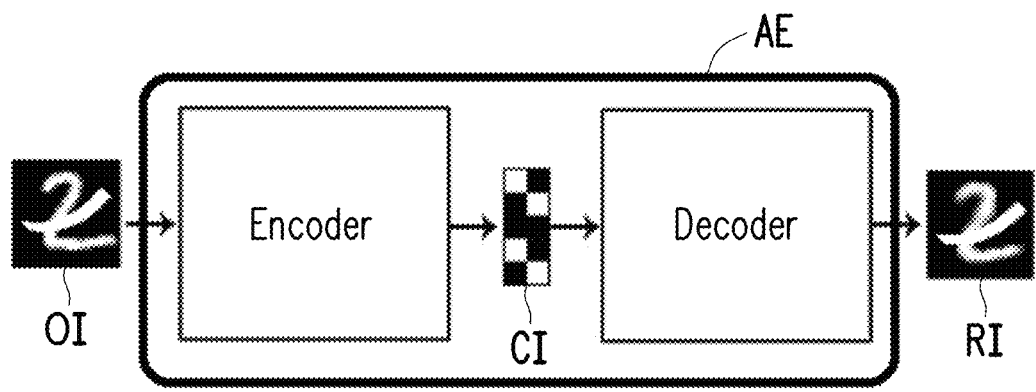
FIG. 6A is an example illustrating AutoEncoder (AE).

With AutoEncoder taken as an example, FIG. 6A is an example illustrating an autoencoder AE. Referring to FIG. 6A, the architecture of the autoencoder AE can be subdivided into two parts: an encoder and a decoder, which respectively perform compression and decompression operations. In the training process, an output value and an input value are trained to have the same meaning (the closer the output value and the input value of lose function, the better). The encoder of the autoencoder AE can perform a dimension reduction, and the decoder can perform reduction, so that the autoencoder AE can be interpreted as using lower-dimensional features to approximate an original input. An original input OI can be processed by the encoder to obtain a compressed embedding code, and this code is a compressed indication CI of the original input OI. In order to obtain an intermediate coded input representation, the code of the compressed indication CI is processed by the decoder to obtain a reconstructed input RI. If the reconstructed input RI of this output is similar to the original input OI, it indicates that there is a specific mapping relationship between this compressed indication CI and the original input OI.

The concept of autoencoder AE is applied to the decision for dividing the sub-encoding unit. In the training phase, the processor 170 may use a reference block to train the anomaly detection model of the autoencoder AE. For example, the reference block may divide the aforementioned scene image or other images into a plurality of training blocks corresponding to the sub-encoding units. In addition, it is assumed that, the anomaly detection model which uses the reference block as input data can output the same or similar blocks. In other words, it can be expected that an estimated block obtained by the autoencoder AE after encoding and then decoding the reference block is almost the same as the reference block. Then, the processor 170 trains the anomaly detection model based on an input object in the training data (e.g., the reference block) and an expected output result (the same or similar reference blocks), so that the expected output result (almost the same as the estimated block of the reference block) can be obtained by inputting the input object to the anomaly detection model. For example, the processor 170 uses the input object as an input variable of a function corresponding to the anomaly detection model, uses the output result as an output variable of the function, and finds the function accordingly.

The processor 170 can form the temporal difference sequence according to a difference between the first sub-encoding unit and the restored unit of the second sub-encoding unit. Specifically, the processor 170 may use one or more sub-encoding units (e.g., the first sub-encoding unit) of one image frame in the image sequence as the reference block for training, and use the trained anomaly detection model to infer whether the restored unit of the corresponding sub-encoding unit (e.g., the second sub-encoding unit) of another image frame at a different time point in the image sequence is close to the reference block. If the estimated block (i.e., the restored block) obtained by inputting the second sub-encoding unit to the autoencoder AE is the same or close to the reference block used for training, it means that the sub-encoding unit has a lower motion difference. If the estimated block (i.e., the restored block) obtained by inputting the second sub-encoding unit to the autoencoder AE is different from the reference block used for training, the anomaly detection model can determine that the sub-encoding unit has as a higher motion difference and needs to be further encoded.

Figure 6B:
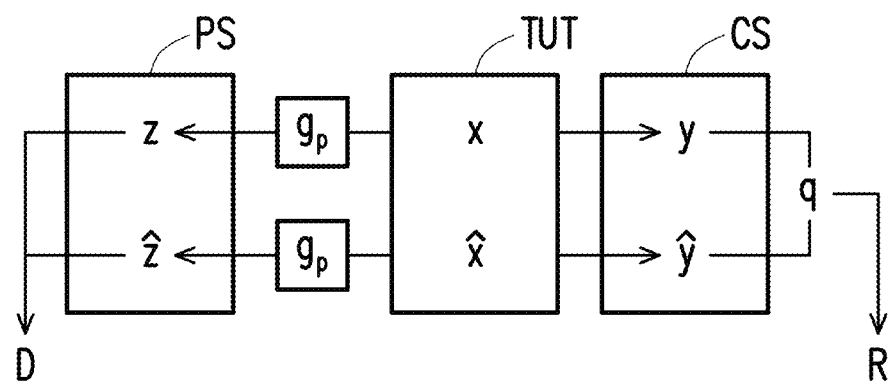
FIG. 6B is a schematic diagram illustrating AE used for determining a unit size according to an embodiment of the invention.

FIG. 6B is a schematic diagram illustrating the autoencoder AE used for determining a unit size according to an embodiment of the invention. Referring to FIG. 6B, the unit size of a sub-encoding unit TUT to be tested is, for example, 32×32, 16×16, 8×8, or 4×4 pixels. It is assumed that the sub-encoding unit TUT has been divided into a specific unit size. A value x of the sub-encoding unit TUT (corresponding to the first sub-encoding unit) is transformed by an analysis function $g_a$ so that a new code y (located in a coding space CS) can be obtained. The code y is quantized so that a quantized value q is obtained. The quantized value q compressed into bits can be used to measure a coding rate R. Then, the quantized value q is inversely quantized to form a code ŷ. After the code ŷ is inversely transformed by a synthesis function $g_s$, a reconstructed sub-encoding unit TUT (its value is x̂) can be obtained. Next, the second sub-encoding unit is input to the value x̂. The sub-encoding units TUT with values x and x̂ are simultaneously transformed by the same function $g_p$ (e.g., the anomaly detection model of the autoencoder) to obtain the restored units with values z and ẑ (located in a perception space PS), respectively. The processor 170 can be derived from formula (1):

$$\min_{g_a, g_s/q} D(z, \hat{z}) + \lambda R(q(y)) = V \tag{1}$$

that a difference V between the two (where λ is a constant; D is a function used to make the values z equal to ẑ and can be implemented by ways of mean square error (MSE) or difference).

Due to the considered temporal difference sequence (corresponding to the temporal correlation between inter frame pixels), the processor 170 generates a series of the differences V according to a time sequence of the corresponding sub-encoding units in different image frames in the image sequence, and accordingly forms the temporal difference sequence. The processor 170 can determine the unit size corresponding to the temporal difference sequence.

In an embodiment, the processor 170 can set a plurality of temporal fineness groups (respectively corresponding to different temporal grain finenesses (corresponding to different unit sizes)), and determine the temporal fineness group corresponding to the temporal difference sequence. For example, Table (1) lists the unit sizes corresponding to different temporal fineness groups T1 to T4:

TABLE 1

| Temporal fineness groups | Unit size |
| --- | --- |
| T1 | 32 × 32 |
| T2 | 16 × 16 |
| T3 | 8 × 8 |
| T4 | 4 × 4 |

Figure 6C:
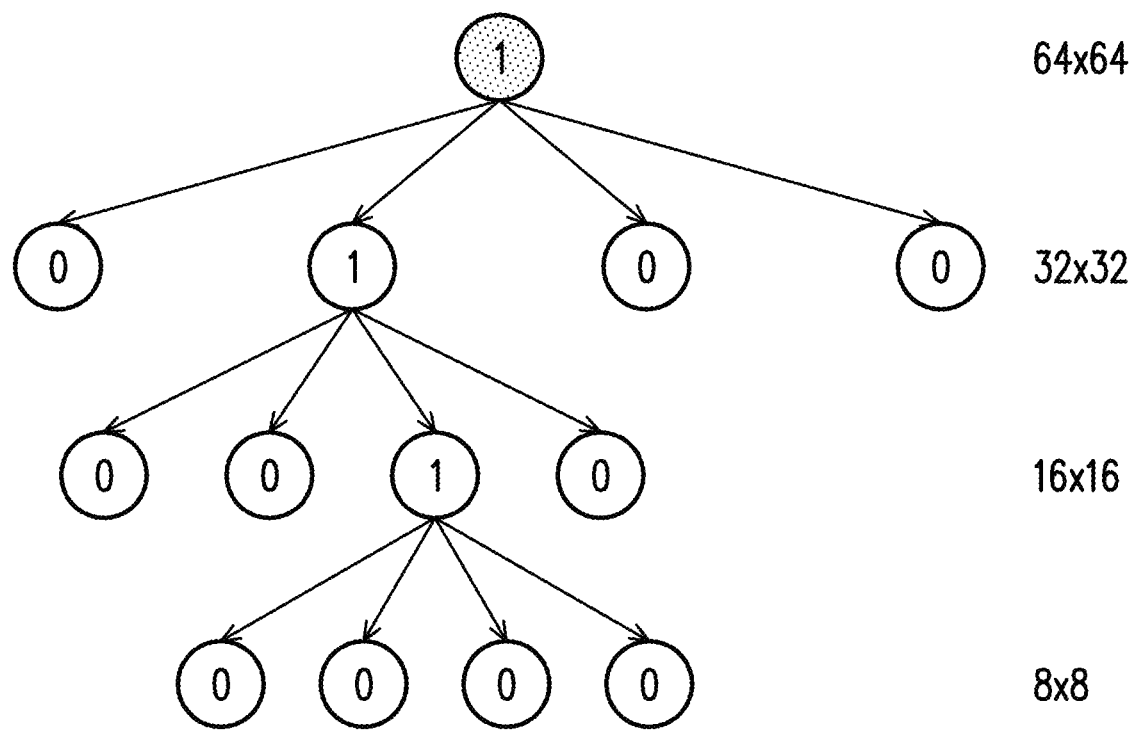
FIG. 6C is an example illustrating a quadtree structure.

The difference V belonging to the temporal fineness group T1 means that the unit size of the first sub-encoding unit is set to 32×32 pixels, that is, a flat region or less detailed information. The difference V belonging to the temporal fineness group T4 means that the unit size of the first sub-encoding unit is set to 4×4 pixels, that is, more detailed information. The rest can be deduced by analogy, and is thus not repeated herein. In addition, FIG. 6C is an example illustrating a quadtree structure. Referring to FIG. 6C, the four temporal fineness groups will form four hierarchies and the encoding can be performed according to the hierarchies. For example, 1 is used to represent smaller units divided.

It should be noted that the number of the temporal fineness groups and their corresponding unit sizes in Table (1) are just examples, and users can change them according to their needs. Further, in some embodiments, based on different training mechanisms, the anomaly detection model may also directly classify the first sub-encoding unit into a specific temporal fineness group.

Referring back to FIG. 5, in an embodiment, the correlation is a spatial correlation. The processor 170 can determine whether to perform an encoding on the sub-encoding unit according to the spatial correlation (step S530). Specifically, the processor 170 determines whether to perform the encoding according to the difference between the first sub-encoding unit and the second sub-encoding unit. In this case, the second sub-encoding unit is another sub-encoding unit in the same image frame as the first sub-encoding unit. The processor 170 uses the concept of "spatial" to determine the difference (i.e., a spatial difference or the spatial correlation) between different blocks in the same image frame. In an embodiment, the spatial difference between the first sub-encoding unit and the second sub-encoding unit is a sum of absolute difference (SAD) between pixels of the first sub-encoding unit and the second sub-encoding unit, and its mathematical expression (2) is:

$$SAD_{1,2} = \Sigma_{i=1}^{N} \Sigma_{j=1}^{N} |B_1(i,j) - B_2(i,j)| \tag{2}$$

Among them, $SAD_{1,2}$ is the sum of absolute difference between pixel coordinates (i,j) of a first sub-encoding unit $B_1$ and a second sub-encoding unit $B_2$; i is an integer between 1 and N; j is an integer between 1 and M; N and M are positive integers.

In other embodiments, the spatial difference may also be a measure of an average difference, a root mean square error, or other differences between the pixels of the first sub-encoding unit and the second sub-encoding unit. In some embodiments, the embodiment shown in FIG. 5 is applicable to the intra encoding mode S411 and the inter encoding mode S414 in FIG. 4. For example, in the intra encoding mode S411, the autoencoder AE and the temporal difference sequence are used for determining a dividing size of the transform unit TU. As another example, in the inter encoding mode S414, the sum of absolute difference of the transform unit TU is used to determine whether to encode the transform unit TU.

After the spatial difference is obtained, the processor 170 can determine whether to perform an encoding of the first sub-encoding unit or the second sub-encoding unit (e.g., corresponding to a certain block in the image frame) according to a magnitude of the difference. If the difference is greater (e.g., not less than a spatial difference threshold, which means that the pixels are more dissimilar), the processor 170 performs the encoding of the first sub-encoding unit or the second sub-encoding unit; if the difference is smaller (e.g., less than the spatial difference threshold, which means that the pixels are more similar; for example, they are all office walls (i.e., the same background)), the processor 170 disables the encoding of the first sub-encoding unit or the second sub-encoding unit.

In an embodiment, for the first sub-encoding unit or the second sub-encoding unit that is disabled for encoding, the processor 170 can combine them to a third sub-encoding unit with a low pixel difference in space to form a combined unit. A difference between the third sub-encoding unit and the first sub-encoding unit or the second sub-encoding unit is less than the spatial difference threshold. That is to say, the sub-encoding units with smaller differences are combined. Then, the processor 170 can perform an encoding of the combined unit. For example, the first sub-encoding unit refers to the predicted value of the third sub-encoding unit to obtain the residual. As another example, the first sub-encoding unit and the third sub-encoding unit are combined together for the prediction and the encoding to be performed at the same time.

In another embodiment, the processor 170 can set a plurality of spatial levels (respectively corresponding to different spatial grain finenesses), and determine the spatial level corresponding to the spatial difference. These spatial levels respectively correspond to a degree of difference between different pixels, and are sorted according to the degree of difference. For example, Table (2) lists value domains corresponding to different spatial levels S1 to S3:

TABLE 2

| Spatial level | Value domain |
| --- | --- |
| S1 | 0 to first level upper limit |
| S2 | First level upper limit to second level upper limit |
| S3 | Second level upper limit to third level upper limit |

The value of the spatial difference that falls between 0 and the first level upper limit is classified to the spatial level S1 which indicates that a pixel difference between the first sub-encoding unit and the second sub-encoding unit is smaller. The value of the spatial difference that falls between the first level upper limit and the second level upper limit is classified to the spatial level S2 which indicates that the pixel difference between the first sub-encoding unit and the second sub-encoding unit is relatively larger (may have a rougher texture). The value of the spatial difference that falls between the second level upper limit and the third level upper limit is classified to the spatial level S3 which indicates that the pixel difference between the first sub-encoding unit and the second sub-encoding unit is even larger (may be an edge pixel of the image frame).

In certain embodiments, the processor 170 can set the spatial difference threshold for determining whether to perform the encoding as the first level upper limit, the second level upper limit or the third level upper limit, so as to determine the sub-encoding units of which spatial level need to be further encoded.

It should be noted that the number of the spatial levels and their corresponding value domains in Table (2) are just examples, and users can change them according to their needs.

In another embodiment, the processor 170 can determine statistical distributions of the entire image frame correlated to a natural image. After the sub-encoding units are divided, the processor 170 determines statistical distributions corresponding to the first sub-encoding unit and the second sub-encoding unit, determines a difference between the two statistical distributions, and accordingly determines whether it is needed to further encode the first sub-encoding unit or the second sub-encoding unit. In another embodiment, the processor 170 can determine whether the statistical distribution corresponding to the first sub-encoding unit or the second sub-encoding unit includes an important feature, and determines to perform the encoding of the first sub-encoding unit or the second sub-encoding unit having the important feature. Specifically, the statistical distributions of the natural image are, for example, based on Natural Scene Statistics (NSS). Natural scene statistics can describe statistical properties of the natural image. The processor 170 can use wavelet or Laplace to calculate the statistical distributions respectively. By determining the statistical distributions of the entire image frame and then dividing it into blocks, the processor 170 can know whether the blocks include the important feature. For example, it is assumed that human face is very important. Among the statistical distributions of the entire image, the statistical distribution of a part corresponding to human face will show the important feature. Even though the divided block may be an eye, the statistical distribution can still indicate that this block important (i.e., because the statistical distribution corresponding to the eye is a part of the statistical distribution of human face, the eye may be determined as the important feature from the statistical distribution corresponding to the eye). Based on the corresponding importance of natural scene statistics, if the two statistical distributions of different sub-encoding units are similar (e.g., using a similarity threshold comparison), it means that a spatial change is the flat region (i.e., they have similar importance, so the encoding or the combining/encoding is not required); If the two statistical distributions are not similar, it means that the spatial change is large (i.e., the difference in importance is large, so the encoding is required). In an embodiment of the invention, if the spatial difference obtained from the sum of absolute difference (SAD) is smaller, the processor can further compare the statistical distributions of the first sub-encoding unit and the second sub-encoding unit. If the two statistical distributions are similar or the same, the encoding can be disabled. With two comparison methods (i.e., the sum of absolute difference and the comparison of the statistical distributions), the accuracy of the spatial difference assessment can be ensured.

In another embodiment, the image can be divided into smaller assessment blocks, and wavelet or Laplace is used to calculate the statistical distribution of each assessment block as a feature value of each assessment block. The feature values of these assessment blocks can be used as a confirmation of a feature extraction in the encoding process. This feature value represents NSS regularity. In some embodiments, the scene image can also be divided into smaller assessment blocks, and wavelet or Laplace is used to calculate the statistical distribution of each assessment block to perform an NSS regularity assessment.

Referring back to FIG. 2, based on decision of the unit size of the sub-encoding unit and decision of whether to perform the enabling, the processor 170 can generate a video stream according to an encoded result of the image sequence (step S230). For example, the processor 170 uses the set unit size to carry the residual between the prediction information and the actual information, the combining/encoding of the sub-encoding unit, or the bit stream generated by decoding the set sub-encoding unit, that is, the encoded result (which can refer to the encoding process 410 in FIG. 4, but not limited to specific video encoding standards). The video stream may be further transmitted through the communication transceiver 110. On the other hand, the processor 57 of the client apparatus 50 can directly or indirectly receive the video stream from the video processing apparatus 100 through the communication transceiver 51, and decode the video stream (perform operations inverse to the encoding operation (e.g., an inverse quantization, an inverse transformation, an addition of the predicted value)) to obtain a reconstructed image frame which can be further played through the display 55.

In addition to the reduction of the encoding complexity, the embodiment of the invention further considers an image quality to avoid degrading the user's viewing experience. An image quality assessment method can be broadly divided into objective and subjective. Common mathematical models for objective assessment include root-mean-square error (RMSE), mean error (MSE) and peak signal to noise ratio (PSNR). With the root mean square error taken as an example, the smaller the value of the root mean square error, the higher the similarity of the image. However, it does not mean that the quality of the image is better. In order to present a subjective visual experience of the user on an image quality of real-time streaming, the embodiment of the invention uses three types of information including bitrate, streaming content, and user experience as assessment factors for the image quality.

On the premise of compatibility with the "resolution", a higher bitrate can accommodate higher video quality. Therefore, when the bitrate of transmitted data is increased, a human perception quality can be improved. In order to improve a quality satisfaction of the user with the real-time streaming and effective use of bandwidth, the amount of transmitted data should be increased when the bitrate is lower. The embodiment of the invention uses "encoding levels" as the mechanism for adjusting the bitrate to meet a subjective quality satisfaction of the user with the real-time streaming, rather than broadly increasing or decreasing the bit rate.

In an embodiment, the processor 170 can determine one of a plurality of encoding levels according to a transmission bandwidth for transmitting the video stream. These encoding levels correspond to the aforementioned spatial levels respectively. For example, an encoding level b1 corresponds to the spatial level S1 of Table (2); an encoding level b2 corresponds to the spatial level S2; and an encoding level b3 corresponds to the spatial level S3. It should be noted that the encoding level is not limited to three, and can vary according to needs.

On the premise of maintaining the image quality, the processor 170 can set the encoding level to be closest to but not exceed an available transmission bandwidth according to a current transmission bandwidth to increase or decrease a data transmission traffic. The main concept is to process (e.g., encode and transmit) parts of the image that are more complex or have more changes in the real-time streaming, whereas the simple parts (e.g., the parts that have no changes or less changes) are not processed. When decoding, the previously coded picture can be used for prediction. Through these dynamic adjustment methods, a balance between an encoding efficiency and a traffic reduction can be further achieved, so as to achieve the user's expectations for the quality of the real-time streaming (e.g., QoE).

When the transmission bandwidth is less than a bandwidth threshold, it means that the available transmission bandwidth is insufficient and the amount of data transmission needs to be decreased. Therefore, the encoding level needs to be increased. For example, the current encoding level is increased by one level or adjusted according to the available transmission bandwidth. Conversely, when the transmission bandwidth is not less than the bandwidth threshold, it means that the available transmission bandwidth is sufficient and the amount of data transmission can be further increased. Therefore, the encoding level can be decreased. For example, the current coding level is decreased by one level or down to the lowest level. For example, if the current encoding level is b2, when the transmission bandwidth is less than 40 Kbps (i.e., the bandwidth threshold), the processor 170 modifies the encoding level to b3.

In addition, the processor 170 can change the spatial difference threshold according to the determined encoding level. If the encoding level is increased (i.e., the transmission bandwidth is decreased), the spatial difference threshold is also increased; if the coding level is decreased (i.e., the transmission bandwidth is increased), the spatial difference threshold is also decreased. For instance, when the transmission bandwidth is decreased, the encoding level is increased to b3, and only the blocks of the edge pixels are encoded and transmitted. For the rest of parts, the previously encoded frames may be used for prediction to decrease the amount of data transmission. On the contrary, when the transmission bandwidth is increased, the encoding level is decreased to b2 or b1, and it is necessary to further encode and transmit the texture or flat blocks. In this way, the encoding mechanism can be reassigned in response to changes in the transmission bandwidth, thereby improving the encoding efficiency and the user's experience on real-time streaming.

Taking an actual situation for further description, it is assumed that the current coding level is b2 corresponding to the spatial level S2, and the bandwidth threshold is set to 40 Kbps. When the transmission bandwidth is less than the bandwidth threshold, a video conferencing application will not work normally (there may be delays or packet loss), and therefore cannot meet the user's expectations on real-time video.

Once the transmission bandwidth is less than the bandwidth threshold, the processor 170 can increase the spatial difference threshold and the encoding level (but not higher than the upper limit of the highest spatial level and the upper limit of the encoding level). For example, the encoding level is increased to b3 and the spatial difference threshold is set to the spatial level S3, i.e., the encoding is required only when the sub-encoding unit is the edge (i.e., the spatial difference is greater than the upper limit of the spatial level S2). That is to say, the encoding is performed on important points (here, the sub-encoding unit with the larger spatial difference is considered as important) of the real-time streaming, so as to reduce the overall bitrate, improve the encoding efficiency, and maintain the quality of the real-time streaming.

Figure 7:
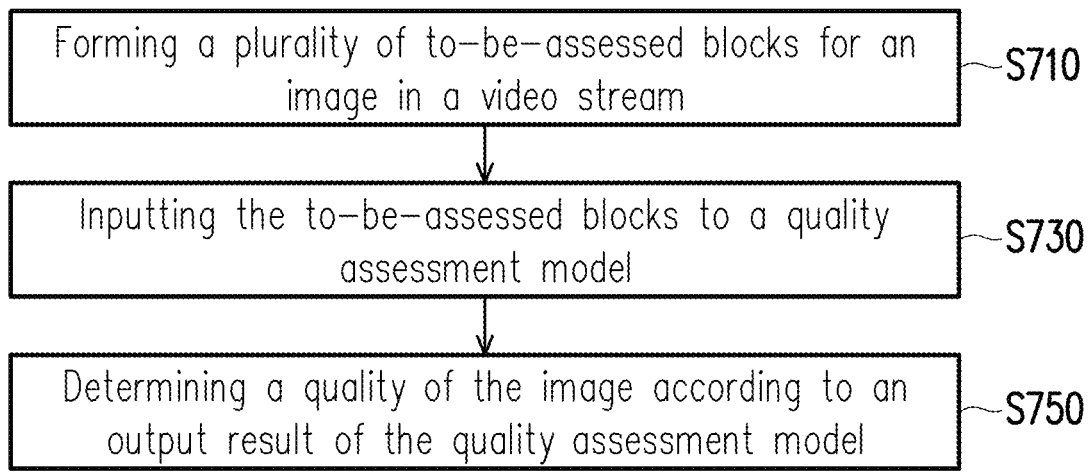
FIG. 7 is a flowchart of an image quality assessment method according to an embodiment of the invention.

In another embodiment, the video processing apparatus 100 can change the encoding mechanism according to a feedback of the client apparatus 50 on the image quality assessment (e.g., with respect to the streaming content and the user experience factors as described above). FIG. 7 is a flowchart of an image quality assessment method according to an embodiment of the invention. Referring to FIG. 7, the processor 57 of the client apparatus 50 forms a plurality of to-be-assessed blocks for an image in a video stream (step S710). Specifically, unlike the traditional technique for the image quality assessment on all pixels of the entire image, the embodiment of the invention uses the block as a basic unit for assessment. The to-be-assessed block may have the unit size of the sub-encoding unit described above or other sizes.

The processor 57 may input the to-be-assessed blocks to a quality assessment model (step S730). Specifically, the quality assessment model is trained based on the machine learning algorithm. The machine learning algorithm can be a capsule network (CapsNet), a convolutional neural network (CNN), a dense convolutional network (DenseNet), or other algorithms.

With the capsule network taken as an example, its difference from CNN in image recognition is that a concept close to biological neural organization is used. When a viewpoint changes, there are a linear effect at the part or the object and nonlinear effects at the pixel. The capsule network has vectors with orientation, and can perform a feature detection based on statistical information. For example, "cat" can be identified based on facial features. In addition, the capsule network can also comprehend the features. For example, if the facial features are not in their specific area (e.g., the mouth is on the forehead, or the eyes are above the ears), the capsule network can detect a different orientation (e.g., a clockwise rotation) of the object, so as to know that the object can only be called "cat" if the facial features are at specific locations.

In an embodiment, the processor 57 can divide the scene image into a plurality of to-be-learned blocks, use those to-be-learned blocks in these scene images as learning data, and use the learning data as training samples for training the quality assessment model. For example, if a meeting image is used as the scene image, human face in the image can be used as important information after the quality assessment model is trained. That is to say, image features are obtained and used as the region of interest for human face. The image features refer to features of a local image that can be learned from the to-be-learned blocks after the to-be-learned blocks are input to the neural network of the machine learning algorithm. The features are, for example, texture and gradient information. In the capsule network, the texture and gradient information and relative position information can be recorded as vectors. In addition, the function of the capsule network can ensure that the position of the important information is correct, so that the important information can be easily identified.

In an embodiment, the processor 57 can use data in mean opinion score (MOS) or differential mean opinion score (DMOS) image database as the learning data, divide the image in the learning data into the to-be-learned blocks, and use these to-be-learned blocks as the training samples for training the quality assessment model.

In another embodiment, the processor 57 may count perception assessment scores subjectively judged by one or more persons on those to-be-learned blocks. The perception assessment score is based on an actual rating result of human perception. With a standardized ITU (International Telecommunication Union) test taken as an example, the ITU test is divided into many stages and composed of at least 15 observers. The observers are required to rate the to-be-learned blocks with a score from 1 to 5. Each person may have a different subjective rating standard for the image quality, so that different persons usually give different scores. The score given by each observer depends on her/his own experiences and preferences, and may even vary according to the mood and things of the day. The processor 57 can use the perception assessment scores corresponding to these to-be-learned blocks as the training samples for training the quality assessment model. By inputting the perception assessment scores of the blocks to the neural network of the machine learning algorithm, the quality assessment model can be established, and the quality assessment model can then be used to infer the image quality of the video stream in other contexts.

In another embodiment, the processor 57 can determine one of multiple objective functions according to the image features, the perception assessment scores, and/or the statistical distributions (based on natural scene statistics) corresponding to the to-be-learned blocks, and use the objective function as the training samples for training the quality assessment model. Specifically, the objective function may be a fitness function of particle swarm optimization (PSO), a cost function calculation of fuzzy decision, or other optimization functions. These objective functions have upper and lower limits. That is to say, an optimal solution of the objective function changes within a feasible region (a.k.a. a tolerance range) between the upper and lower limits. In the process of encoding and decoding, the reduction or loss of information is unavoidable. Therefore, the solution of the objective function can be obtained within an interval, and the upper and lower limits of the objective function aim to allow the image quality to be improved or reduced within a certain tolerance range. The main goal is to find the optimal solution (i.e., the same image quality as the corresponding block of the original image), followed by finding other relevant feasible solutions (the image quality improved or reduced within the tolerance range).

Take the image feature, the perception assessment score and the statistical distribution as parameters of the objective function as an example:

$$\min\_f = \min \text{block}(t,m,n) \quad (3)$$

$$\max\_f = \max \text{block}(t,m,n) \quad (4)$$

The objective function block (t, m, n) includes the image feature t, the perception assessment score m and the statistical distribution n. max_f represents the upper limit and min_f represents the lower limit. That is to say, a solution target can vary between the upper limit max_f and the lower limit min_f.

It should be noted that equations (3) and (4) are merely illustrative examples, and other embodiments may use any one of the image feature, the perception assessment score, and the statistical distribution as the parameters of the objective function.

The processor 57 can determine a quality of the image according to an output result of the quality assessment model (step S750). Specifically, the trained quality assessment model can use the to-be-assessed blocks as the input data and accordingly infer the corresponding result. In an embodiment, if the image feature, the perception assessment score, the statistical distribution and the objective function of the scene image and/or training data are used as the learning data of the quality assessment model, the output result of the quality assessment model can include the specific image feature, the perception assessment score, the statistical distribution and the objective function. For example, the quality assessment model extracts the image features from the to-be-assessed block in the reconstructed image frame of the video stream, identifies the block corresponding to a type (e.g., human face, eyes, or mouth) to which the image feature belongs, and correspondingly obtains the perception assessment score, the statistical distribution and objective function according to the block of such type.

Then, the processor 57 can determine a calculated value of the objective function corresponding to each of the to-be-assessed blocks according to the image feature, the perception assessment score, the statistical distribution and the objective function in the output result (i.e., the calculated value of the to-be-assessed block is determined according to all of the image feature, the perception assessment score and the statistical distribution). The processor 57 can determine the quality of the corresponding to-be-assessed block based on this calculated value. That is to say, the calculated value is an index of the image quality.

In an embodiment, the processor 57 can determine whether the calculated value is between the upper and lower limits of the corresponding objective function (i.e., the tolerance range). If the calculated value is within the upper and lower limits of the optimal solution, it means that a perception acceptance of the user on the to-be-assessed block is within the tolerance range (the difference represents a tolerance, and upper and lower limits of the optimal solution can be modified through experience or dynamically), and the reconstructed image frame (i.e., the image frame of the decoded the video stream) can be further played through the display 55. If the calculated value is not within the upper and lower limits or there is no solution, it means that the objective function cannot reach the optimal solution, the perception acceptance of the user on the to-be-assessed block is not within the tolerance range, or an frame distortion has occurred. Accordingly, a request for image re-encoding can be sent through the communication transceiver 51. If the calculated value is equal to the optimal solution, it means that the user has the same perception acceptance on the to-be-assessed block, and the reconstructed image frame can be further played through the display 55.

In another embodiment, if the image feature, the perception assessment score and the objective function of the scene image and/or training data are used as the learning data of the quality assessment model, the output result of the quality assessment model can include the specific image feature, the perception assessment score and the objective function (the objective function is formed according to the image feature and the perception assessment score in this embodiment). Then, the processor 57 can input the image feature and the perception assessment score in the output result to the objective function in the output result, determine the calculated value of the objective function corresponding to each of the to-be-assessed blocks (i.e., determine the calculated value corresponding to the to-be-assessed block according to the image feature and the perception assessment score), and use the calculated value as the index of the image quality.

In yet another embodiment, if the image feature, the statistical distribution and the objective function of the scene image and/or training data are used as the learning data of the quality assessment model, the output result of the quality assessment model can include the specific image feature, the statistical distribution and the objective function (the objective function is formed according to the image feature and the statistical distribution in this embodiment). Then, the processor 57 can input the image feature and the statistical distribution in the output result to the objective function in the output result, determine the calculated value of the objective function corresponding to each of the to-be-assessed blocks (i.e., determine the calculated value corresponding to the to-be-assessed block according to the image feature and the statistical distribution), and use the calculated value as the index of the image quality.

Since a pixel distribution in the image frame is not a uniform distribution, one single to-be-assessed block in the image frame may not reflect all the pixels in the entire image frame, and the degree of attention of the user to each of the to-be-assessed blocks may also be different. In general, the important information (e.g., the people in the conference room are more important than the background of the conference room) or information that changes a lot (e.g., switching of scenes or changing of speakers) is the part that users pay attention to.

In order to consider the influence of different to-be-assessed blocks on the image quality assessment, the embodiment of the invention uses the encoding levels as weights for the weighted average of the to-be-assessed blocks. The processor 57 can determine the encoding level of each of the to-be-assessed blocks, and different encoding levels correspond to different weights. With the encoding levels in Table (2) taken as an example, the encoding levels b3, b2, and b1 correspond to weights w3, w2, and w1, respectively. Compared with the encoding level b1, the encoding level b3 can make the user pay more attention, so a value of the weight w3 is greater than a value of the weight w1. That is to say, the higher the encoding level, the higher the value of the weight. Conversely, the lower the coding level, the lower the value of the weight. The processor 57 can determine a quality of the entire image frame according to the qualities of the to-be-assessed blocks (e.g., the calculated values described above) and the corresponding weights. A calculation formula for the quality of the image frame is as follows:

$$Q = \frac{\sum_{k=1}^{L} q_k w_k}{\sum_{k=1}^{L} w_k} \quad (5)$$

Q is the quality of the entire image frame; $q_k$ is the quality of a k-th to-be-assessed block; $w_k$ is the weight of the k-th to-be-assessed block; it is assumed that the image frame is divided into L to-be-assessed blocks, and L is a positive integer.

With the image frame divided into three to-be-assessed blocks taken as an example, the weights corresponding to the encoding levels b3, b2, and b1 are 60%, 30%, and 10%, respectively. The quality of the entire image frame is $(q_1*0.6+q_2*0.3+q_3*0.1)/(0.6+0.3+0.1)$.

It should be noted that if a score of the image quality is based on DMOS or MOS, the higher the DMOS score, the worse the quality; or the higher the MOS score, the higher the quality.

In addition, if a feedback regarding poor quality is obtained, the video processing apparatus 100 can change the encoding mechanism according to the result of the image quality assessment. In an embodiment, the processor 170 further changes the spatial difference threshold according to the image quality of the decoded video stream (e.g., the quality of the entire image frame or the qualities of a part of the to-be-assessed blocks). For example, if the image quality is poor (the calculated value is not within the tolerance range), the processor 170 can decrease the spatial difference threshold so that the sub-encoding units with the decreased spatial level (i.e., in the lower value domain) can be used to obtain more encoding information (the encoding is not performed on these original sub-encoding units with the lower spatial level and other predicted values are referenced when decoding; or, the encoding may also be performed if the sub-encoding units match the lower spatial level after the spatial difference threshold is decreased), and re-encode these sub-encoding units.

In another embodiment, the processor 170 can change the unit size according to the image quality of the decoded video stream. If the image quality is poor, the processor 170 can extend the limitation for determining the unit size in the encoding process. For example, the processor 170 can reduce the unit sizes corresponding to the temporal fineness groups to increase the detail information.

In summary, according to the video processing apparatus and a processing method of video stream of the embodiments of the invention, the spatial and temporal features in the image frame are divided into different grain finenesses, the anomaly detection model is used as a decision reference for an encoding unit structure to divide the sub-encoding units, and determine an interval threshold the spatial level to which each sub-encoding unit belongs. Accordingly, whether it is needed to encode the sub-encoding units is determined, thereby reducing the encoding complexity. In addition, NSS statistical features can be used to help providing a more accurate decision for dividing. On the other hand, the embodiment of the invention integrates three types of information: the transmission bandwidth, the perception assessment score, and statistical distribution of natural scene as assessment factors of the image quality. The user's subjective quality satisfaction with the real-time streaming is achieved by dynamically adjusting the bitrate based on the encoding levels, rather than broadly increasing or decreasing the bit rate. In addition, the embodiment of the invention adopts the concept of no-reference (NR) image quality assessment, which does not require a comparison of reference images nor to extract the image features for all pixels in the image. With reference to the NSS statistical features, the neural network of the machine learning algorithm of the embodiment of the invention extracts the image features of the to-be-assessed blocks, and uses the encoding level to weight the pixels of the to-be-assessed block, thereby performing the quality assessment on the entire image. The image quality assessment can be further fed back to the encoding mechanism, so that the adjusted encoding mechanism can meet the needs of human visual perception.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

The invention claimed is:

1. A processing method of video stream, comprising:
   forming at least one encoding unit in an image frame, wherein the image frame is an image of the image sequence, and each of the encoding units records encoding information of a belonging block;
   encoding a plurality of sub-encoding units in the encoding units of the image sequence according to a correlation between a first sub-encoding unit and a second sub-encoding unit in the sub-encoding units, comprising:
      determining whether to perform an encoding of the first sub-encoding unit or the second sub-encoding unit according to a difference between the first sub-encoding unit and the second sub-encoding unit in response to the second sub-encoding unit being another sub-encoding unit in the same image frame as the first sub-encoding unit, comprising:
         determining statistical distributions of the image frame correlated to a natural image;
         respectively determining statistical distributions corresponding to the first sub-encoding unit and the second sub-encoding unit according to the statistical distributions of the image frame; and
         determining whether to perform the encoding of the first sub-encoding unit or the second sub-encoding unit according to the statistical distributions corresponding to the first sub-encoding unit and the second sub-encoding unit; and
   generating a video stream according to an encoded result of the image sequence.

2. The processing method of video stream of claim 1, wherein the step of encoding the sub-encoding units in the encoding units of the image sequence according to the correlation between the first sub-encoding unit and the second sub-encoding unit in the sub-encoding units further comprises:
   in response to the difference being less than a spatial difference threshold, disabling the encoding of the first sub-encoding unit or the second sub-encoding unit; and
   in response to the difference not being less than the spatial difference threshold, performing the encoding of the first sub-encoding unit or the second sub-encoding unit.

3. The processing method of video stream of claim 1, further comprising determining a unit size of the first sub-encoding unit or the second sub-encoding unit according to a difference between the first sub-encoding unit and the second sub-encoding unit in response to the second sub-encoding unit is a corresponding sub-encoding unit in another frame in the image sequence different from the image frame, comprising:
   inputting the second sub-encoding unit to an anomaly detection model to obtain a restored unit, wherein the anomaly detection model is trained by using the first sub-encoding unit as training data based on a machine learning algorithm;
   forming a temporal difference sequence according to a difference between the first sub-encoding unit and the restored unit of the second sub-encoding unit; and
   determining the unit size corresponding to the temporal difference sequence.

4. The processing method of video stream of claim 2, wherein the difference between the first sub-encoding unit and the second sub-encoding unit is a sum of absolute difference (SAD) between pixels of the first sub-encoding unit and the second sub-encoding unit.

5. The processing method of video stream of claim 2, wherein the step of disabling the encoding of the first sub-encoding unit or the second sub-encoding unit comprises:

combining the first sub-encoding unit or the second sub-encoding unit into a third sub-encoding unit to form a combined unit, wherein a difference between the third sub-encoding unit and the first sub-encoding unit or the second sub-encoding unit is less than the spatial difference threshold; and performing an encoding of the combined unit.

6. The processing method of video stream of claim 2, wherein the step of determining whether to perform the encoding of the first sub-encoding unit or the second sub-encoding unit according to the difference between the first sub-encoding unit and the second sub-encoding unit further comprises:

determining one of a plurality of encoding levels according to a transmission bandwidth for transmitting the video stream; and changing the spatial difference threshold according to the determined encoding level.

7. The processing method of video stream of claim 2, further comprising:

changing the spatial difference threshold according to an image quality of the video stream decoded.

8. The processing method of video stream of claim 1, further comprising:

changing a unit size according to an image quality of the video stream decoded.

9. A video processing apparatus, comprising:

a communication transceiver, configured to transmit or receive data; and a processor, coupled to the communication transceiver, and configured to:

form at least one encoding unit in an image frame, wherein the image frame is an image of the image sequence, and each of the encoding units records encoding information of a belonging block;

encode a plurality of sub-encoding units in the encoding units of the image sequence according to a correlation between a first sub-encoding unit and a second sub-encoding unit in the sub-encoding units, comprising:

determine whether to perform an encoding of the first sub-encoding unit or the second sub-encoding unit according to a difference between the first sub-encoding unit and the second sub-encoding unit in response to the second sub-encoding unit being another sub-encoding unit in the same image frame as the first sub-encoding unit by:

determining statistical distributions of the image frame of a natural image;

respectively determining statistical distributions corresponding to the first sub-encoding unit and the second sub-encoding unit according to the statistical distributions of the image frame; and determining whether to perform the encoding of the first sub-encoding unit or the second sub-encoding unit according to the statistical distributions corresponding to the first sub-encoding unit and the second sub-encoding unit; and generate a video stream according to an encoded result of the image sequence, wherein the video stream is transmitted through the communication transceiver.

10. The video processing apparatus of claim 9, wherein the processor is further configured to:

in response to the difference being less than a spatial difference threshold, disable the encoding of the first sub-encoding unit or the second sub-encoding unit; and in response to the difference not being less than the spatial difference threshold, perform the encoding of the first sub-encoding unit or the second sub-encoding unit.

11. The video processing apparatus of claim 9, wherein the processor is further configured to determine a unit size of the first sub-encoding unit or the second sub-encoding unit according to a difference between the first sub-encoding unit and the second sub-encoding unit in response to the second sub-encoding unit is a corresponding sub-encoding unit in another frame in the image sequence different from the image frame by:

inputting the second sub-encoding unit to an anomaly detection model to obtain a restored unit, wherein the anomaly detection model is trained by using the first sub-encoding unit as training data based on a machine learning algorithm;

forming a temporal difference sequence according to a difference between the first sub-encoding unit and the restored unit of the second sub-encoding unit; and determining the unit size corresponding to the temporal difference sequence.

12. The video processing apparatus of claim 10, wherein the difference between the first sub-encoding unit and the second sub-encoding unit is a sum of absolute difference between pixels of the first sub-encoding unit and the second sub-encoding unit.

13. The video processing apparatus of claim 10, wherein the processor is further configured to:

combine the first sub-encoding unit or the second sub-encoding unit into a third sub-encoding unit to form a combined unit, wherein a difference between the third sub-encoding unit and the first sub-encoding unit or the second sub-encoding unit is less than the spatial difference threshold; and perform an encoding of the combined unit.

14. The video processing apparatus of claim 10, wherein the processor is further configured to:

determine one of a plurality of encoding levels according to a transmission bandwidth for transmitting the video stream; and change the spatial difference threshold according to the determined encoding level.

15. The video processing apparatus of claim 10, wherein the processor is further configured to:

receive an image quality of the video stream decoded through the communication transceiver; and change the spatial difference threshold according to the image quality.

16. The video processing apparatus of claim 9, wherein the processor is further configured to:

receive an image quality of the video stream decoded through the communication transceiver; and change a unit size according to the image quality.

* * * * *

UNITED STATES PATENT AND TRADEMARK OFFICE
CERTIFICATE OF CORRECTION

PATENT NO. : 11,363,298 B2  
APPLICATION NO. : 17/022097  
DATED : June 14, 2022  
INVENTOR(S) : Yuan-Bin Lee et al.

It is certified that error appears in the above-identified patent and that said Letters Patent is hereby corrected as shown below:

On the Title Page

Item (73) Assignee should read: Wistron Corporation, New Taipei City, (TW)

Signed and Sealed this  
Sixteenth Day of August, 2022

Katherine Kelly Vidal  
*Director of the United States Patent and Trademark Office*